United States Patent
Phillips et al.

(10) Patent No.: US 9,422,880 B2
(45) Date of Patent: Aug. 23, 2016

(54) TORQUE CONVERTER CLUTCH LOCKUP DURING SKIP-FIRE OPERATION

(71) Applicant: Tula Technology, Inc., San Jose, CA (US)

(72) Inventors: Andrew W. Phillips, Rochester, MI (US); Steven E. Carlson, Oakland, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 14/704,630

(22) Filed: May 5, 2015

(65) Prior Publication Data

US 2015/0232103 A1 Aug. 20, 2015

Related U.S. Application Data (63) Continuation-in-part of application No. 13/963,819, filed on Aug. 9, 2013, now Pat. No. 9,267,454.

(60) Provisional application No. 62/007,746, filed on Jun. 4, 2014, provisional application No. 61/682,553, filed on Aug. 13, 2012.

(51) Int. Cl.

| | |
|---|---|
| *F02D 41/00* | (2006.01) |
| *F02D 13/06* | (2006.01) |
| *B60W 30/20* | (2006.01) |
| *F02D 29/02* | (2006.01) |
| *F02P 5/15* | (2006.01) |
| *F16H 61/14* | (2006.01) |

(Continued)

(52) U.S. Cl.
CPC .......... *F02D 41/0087* (2013.01); *B60W 10/02* (2013.01); *B60W 10/026* (2013.01); *B60W 10/06* (2013.01); *B60W 30/20* (2013.01); *F02D 13/06* (2013.01); *F02D 29/02* (2013.01); *F02D 41/022* (2013.01); *F02D 41/123* (2013.01); *F02P 5/1512* (2013.01); *F16H 61/143* (2013.01); *F02D 11/105* (2013.01); *F02D 41/18* (2013.01); *F02D 2250/18* (2013.01); *F16H 2061/145* (2013.01); *Y10T 477/73* (2015.01)

(58) Field of Classification Search
CPC ............. F02D 41/0087; F02D 41/022; F02D 41/123; F02D 13/06
USPC ..... 123/350, 481, 325, 332, 198 F; 701/111, 701/112; 477/39, 181
See application file for complete search history.

(56) References Cited

U.S. PATENT DOCUMENTS

| | | | |
|---|---|---|---|
| 4,434,767 A | 3/1984 | Kohama et al. | |
| 4,489,695 A | 12/1984 | Kohama et al. | |

(Continued)

OTHER PUBLICATIONS

International Search Report dated Feb. 5, 2014 from International Application No. PCT/US2013/054417.

(Continued)

*Primary Examiner* — Mahmoud Gimie
(74) *Attorney, Agent, or Firm* — Beyer Law Group, LLP (57) ABSTRACT

A variety of methods and arrangements for determining conditions when an engine-decoupling friction interface may be locked-up during skip-fire operation of an internal combustion engine are described. In some embodiments, the engine-decoupling friction interface is the lockup clutch of a torque converter situated in a powertrain that transmits motive power from the engine to a wheel. Rotation of the wheel causes vehicle motion.

18 Claims, 4 Drawing Sheets

(51) Int. Cl.
  *B60W 10/02* (2006.01)
  *B60W 10/06* (2006.01)
  *F02D 41/12* (2006.01)
  *F02D 41/02* (2006.01)
  *F02D 41/18* (2006.01)
  *F02D 11/10* (2006.01)

(56) References Cited

U.S. PATENT DOCUMENTS

| | | | |
|---|---|---|---|
| 4,509,488 A | | 4/1985 | Forster et al. |
| 4,921,064 A | | 5/1990 | Wazaki et al. |
| 5,374,224 A | | 12/1994 | Huffmaster et al. |
| 5,377,631 A | | 1/1995 | Schechter |
| 5,540,633 A | | 7/1996 | Yamanaka et al. |
| 5,785,628 A | * | 7/1998 | Kamada ............... F16H 59/08 477/130 |
| 6,158,411 A | | 12/2000 | Morikawa |
| 6,619,258 B2 | | 9/2003 | McKay et al. |
| 6,843,752 B2 | | 1/2005 | Bolander |
| 7,032,545 B2 | | 4/2006 | Lewis et al. |
| 7,032,581 B2 | | 4/2006 | Gibson et al. |
| 7,063,062 B2 | | 6/2006 | Lewis et al. |
| 7,066,136 B2 | | 6/2006 | Ogiso |
| 7,086,386 B2 | | 8/2006 | Doering |
| 7,179,199 B2 | | 2/2007 | Kushiyama et al. |
| 7,231,907 B2 | | 6/2007 | Bolander et al. |
| 7,288,046 B2 | | 10/2007 | Boone et al. |
| 7,503,312 B2 | | 3/2009 | Surnilla et al. |
| 7,509,201 B2 | | 3/2009 | Bolander et al. |
| 7,532,972 B2 | | 5/2009 | Kolmanovsky et al. |
| 7,577,511 B1 | | 8/2009 | Tripathi et al. |
| 7,651,441 B2 | | 1/2010 | Maguire et al. |
| 7,785,230 B2 | | 8/2010 | Gibson et al. |
| 7,849,835 B2 | | 12/2010 | Tripathi et al. |
| 7,886,715 B2 | | 2/2011 | Tripathi et al. |
| 7,930,087 B2 | | 4/2011 | Gibson et al. |
| 7,941,994 B2 | | 5/2011 | Surnilla et al. |
| 7,954,474 B2 | | 6/2011 | Tripathi et al. |
| 8,052,575 B2 | | 11/2011 | Albertson et al. |
| 8,099,224 B2 | | 1/2012 | Tripathi et al. |
| 8,131,445 B2 | | 3/2012 | Tripathi et al. |
| 8,131,447 B2 | | 3/2012 | Tripathi et al. |
| 2005/0216132 A1 | | 9/2005 | Masters et al. |
| 2007/0131196 A1 | * | 6/2007 | Gibson ................... F01L 1/38 123/198 F |
| 2007/0243971 A1 | | 10/2007 | Brevick |
| 2008/0262712 A1 | | 10/2008 | Duty et al. |
| 2008/0288146 A1 | * | 11/2008 | Beechie ............... B60W 10/023 701/58 |
| 2010/0050993 A1 | | 3/2010 | Zhao et al. |
| 2011/0030657 A1 | | 2/2011 | Tripathi et al. |
| 2011/0288734 A1 | | 11/2011 | Phillips et al. |
| 2014/0041626 A1 | | 2/2014 | Wilcutts et al. |

OTHER PUBLICATIONS

Written Opinion dated Feb. 5, 2014 from International Application No. PCT/US2013/054417.

* cited by examiner

TORQUE CONVERTER CLUTCH LOCKUP DURING SKIP-FIRE OPERATION

CROSS REFERENCE TO RELATED APPLICATIONS

This application claims priority of Provisional Application No. 62/007,746 filed Jun. 4, 2014. This application is also a Continuation-in-part of U.S. application Ser. No. 13/963,819 filed Aug. 9, 2013, which claims priority of Provisional Application No. 61/682,553 filed Aug. 13, 2012. Each of these priority applications are incorporated herein by reference.

FIELD OF THE INVENTION

The present invention relates generally to vehicles powered by internal combustion engines operating under skip-fire control. More particularly the slip of a powertrain component, such as a torque converter, is minimized to improve fuel efficiency.

BACKGROUND

Fuel efficiency of internal combustion engines can be substantially improved by varying the displacement of the engine. This allows for the full torque to be available when required, yet can significantly reduce pumping losses and improve thermal efficiency by using a smaller displacement when full torque is not required. The most common method today of implementing a variable displacement engine is to deactivate a group of cylinders substantially simultaneously. In this approach the intake and exhaust valves associated with the deactivated cylinders are kept closed and no fuel is injected when it is desired to skip a combustion event. For example, an 8 cylinder variable displacement engine may deactivate half of the cylinders (i.e. 4 cylinders) so that it is operating using only the remaining 4 cylinders. Commercially available variable displacement engines available today typically support only two or at most three displacements.

Another engine control approach that varies the effective displacement of an engine is referred to as "skip-fire" engine control. In general, skip-fire engine control contemplates selectively skipping the firing of certain cylinders during selected firing opportunities. Thus, a particular cylinder may be fired during one engine cycle and then may be skipped during the next engine cycle and then selectively skipped or fired during the next. In this manner, even finer control of the effective engine displacement is possible. For example, firing every third cylinder in a 4 cylinder engine would provide an effective displacement of $\frac{1}{3}^{rd}$ of the full engine displacement, which is a fractional displacement that is not obtainable by simply deactivating a set of cylinders.

U.S. Pat. No. 8,131,445 (which is incorporated herein by reference) teaches a continuously variable displacement engine using a skip-fire operational approach, which allows any fraction of the cylinders to be fired on average using individual cylinder deactivation. In a continuously variable displacement mode operated in skip-fire, the amount of torque delivered generally depends heavily on the firing fraction, or fraction of combustion events that are not skipped. In other skip-fire approaches a particular firing pattern or firing fraction may be selected from a set of available firing patterns or fractions.

Vehicles require a method to disengage the engine from the drive wheels and vary the relative rotation rates between the engine and wheels. Various mechanisms can be employed to satisfy these requirements. In particular, vehicles often use an automatic transmission (to adjust the relative engine/wheel rotation rates) coupled to a torque converter (to disengage the engine and wheels). The torque converter uses a fluid coupling to transfer power from the engine to the remainder of the powertrain. The torque converter also typically includes a lockup or torque converter clutch (TCC) that provides a direct mechanical coupling in parallel with the fluid coupling. Engaging the TCC allows the torque converter to operate in a locked or partially locked state. This improves the vehicle fuel efficiency, since less power is lost in the torque converter. Generally the fluid and mechanical coupling work cooperatively using a single control input, the pressure of the hydraulic fluid within the torque converter, to transfer torque from the engine to the remainder of the powertrain. When the vehicle is operating in a steady-state cruising mode, such as open road highway driving, torque converter slip values in the range of 20-80 revolutions per minute (RPM) are typical. This slip results in a power and associated fuel economy loss, which can be estimated by taking the ratio of the torque converter slip to the engine speed. For example, if the engine is operating at 2000 rpm and the torque converter slip is 40 rpm, the efficiency loss in the torque converter is approximately 2% (40/2000).

The torque converter fluid can only transmit torque when the torque converter is slipping, since a mismatch between the rotation speeds of the torque converter input and output shafts is required for the fluid to transmit torque. In the case of a non-slipping, locked-up torque converter, the engine torque is transmitted by the torque converter clutch and a rigid mechanical connection exists between the engine and remainder of the powertrain. While this condition is advantageous from a fuel economy standpoint, since no power is lost in the torque converter, modern vehicle control generally seeks to avoid this condition because of its propensity to cause excessive noise, vibration, and harshness (NVH).

A potential problem with skip-fire engine control is that the non-uniform firing pattern results in increased noise, vibration, and harshness (NVH). In particular a vehicle powertrain is a naturally lightly-damped oscillatory system that can oscillate in response to rapid changes in the engine output torque, such as may be generated by a firing pattern of a skip-fire controlled engine. Various control systems have been proposed that operate an engine so as to avoid exciting the natural oscillatory frequencies of the powertrain or increase the slip in a torque converter so that these frequencies are not transmitted through the torque converter. In particular the slip of the torque converter may be increased to dampen any undesirable vibrations originating from a transition in the number of activated cylinders. Increasing slip has the undesirable effect of decreasing fuel efficiency, which negates some of the benefits of skip-fire control. It would be desirable to reduce torque converter slippage in a vehicle using a skip-fire controlled engine to further improve vehicle fuel efficiency.

SUMMARY

A variety of methods and devices for improving the fuel efficiency of a vehicle by locking up the torque converter clutch under certain operating conditions for an internal combustion engine operating under skip-fire control are described. In some aspects, the engine is operated to supply motive power to move the vehicle. The engine motive power is transferred through the torque converter, which is part of the vehicle powertrain. The torque converter clutch is locked-up under certain engine operating conditions. The torque converter clutch can be fully locked-up, with no slip, or substantially locked-up, with controlled slip, to avoid transmitting vibrations, as high-frequency changes in engine speed, to the rest of the powertrain. The engine conditions that allow torque converter clutch lock-up correspond to engine combustion event frequencies which do not overlap with powertrain resonances. Under such engine conditions acceptable NVH performance can be achieved despite use of a locked-up torque converter clutch.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention describes methods and devices for improving the fuel efficiency of a vehicle by locking up the torque converter clutch under certain operating conditions for an internal combustion engine operating under skip-fire control.

Figure 1A:
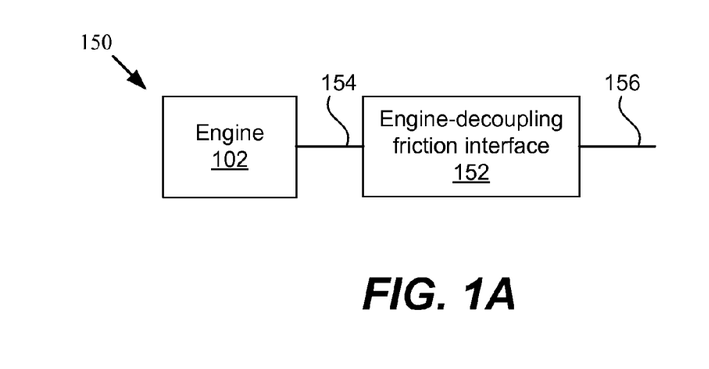
FIG. 1A is a schematic diagram of a portion of a powertrain.

FIG. 1A schematically illustrates a portion of an exemplary powertrain 150. The powertrain 150 includes an internal combustion engine 102 operating under skip-fire control. Power generated by the engine 102 is coupled to an engine-decoupling friction interface 152 by means of an input shaft 154. The engine-decoupling friction interface 152 transfers engine power to downstream powertrain components (not shown in FIG. 1A) via output shaft 156. The engine-decoupling friction interface 152 allows variable amounts of slip between input shaft 154 and output shaft 156. In some cases as described below the engine-decoupling friction interface may be locked-up such that there is no or very little difference between the rotation speeds of input shaft 154 and output shaft 156. The engine-decoupling friction interface 152 may be a lockup clutch of a torque converter, an input clutch of an automated manual transmission, an input clutch of a dual-clutch transmission, or any other mechanism that allows decoupling an engine from downstream powertrain components.

Figure 1B:
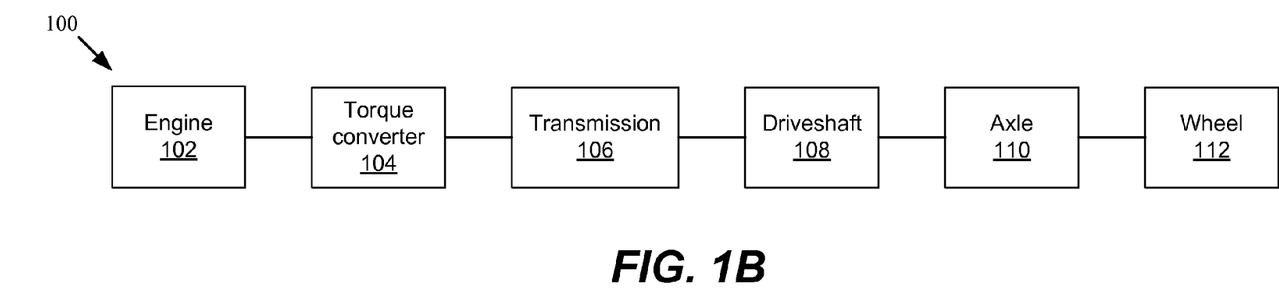
FIG. 1B is a schematic diagram of a vehicle powertrain.

FIG. 1B schematically illustrates an exemplary vehicle powertrain 100.

Motive power is supplied by an internal combustion engine 102. The power is generated by combustion in a working chamber and transferred to a crankshaft (not shown in FIG. 1B). Power or torque associated with each combustion event varies depending on the engine operating conditions, such as intake manifold pressure, spark advance, and intake and exhaust valve timing. The engine 102 operates over a range of rotational speeds and output torque levels. The engine 102 is coupled to a torque converter 104, which adjusts the torque and rotational speed of the downstream powertrain elements. The torque converter 104 in turn is coupled to a transmission 106, which allows variation of the rotation speed and torque between the transmission input and output. The transmission 106 may utilize a discrete set of gears (i.e. a multi-speed transmission) or it may allow a continuous adjustment of the rotational speeds (i.e. a continuously variable transmission). The transmission may also include a setting to reverse the rotation directions of its input and output (reverse gear). The transmission 106 is coupled to a drive shaft 108, which transmits power from the transmission 106 to an axle 110. A differential, not shown in FIG. 1B, may be used to couple the power between the drive shaft 108 and axle 110. The axle 110 is coupled to a wheel 112. Rotation of the wheel 112 allows the vehicle to move forward or backward if the transmission 106 is set into reverse. FIG. 1B should be considered as exemplary only and various powertrains may have extra components or may remove certain components from the powertrain 100.

Figure 2:
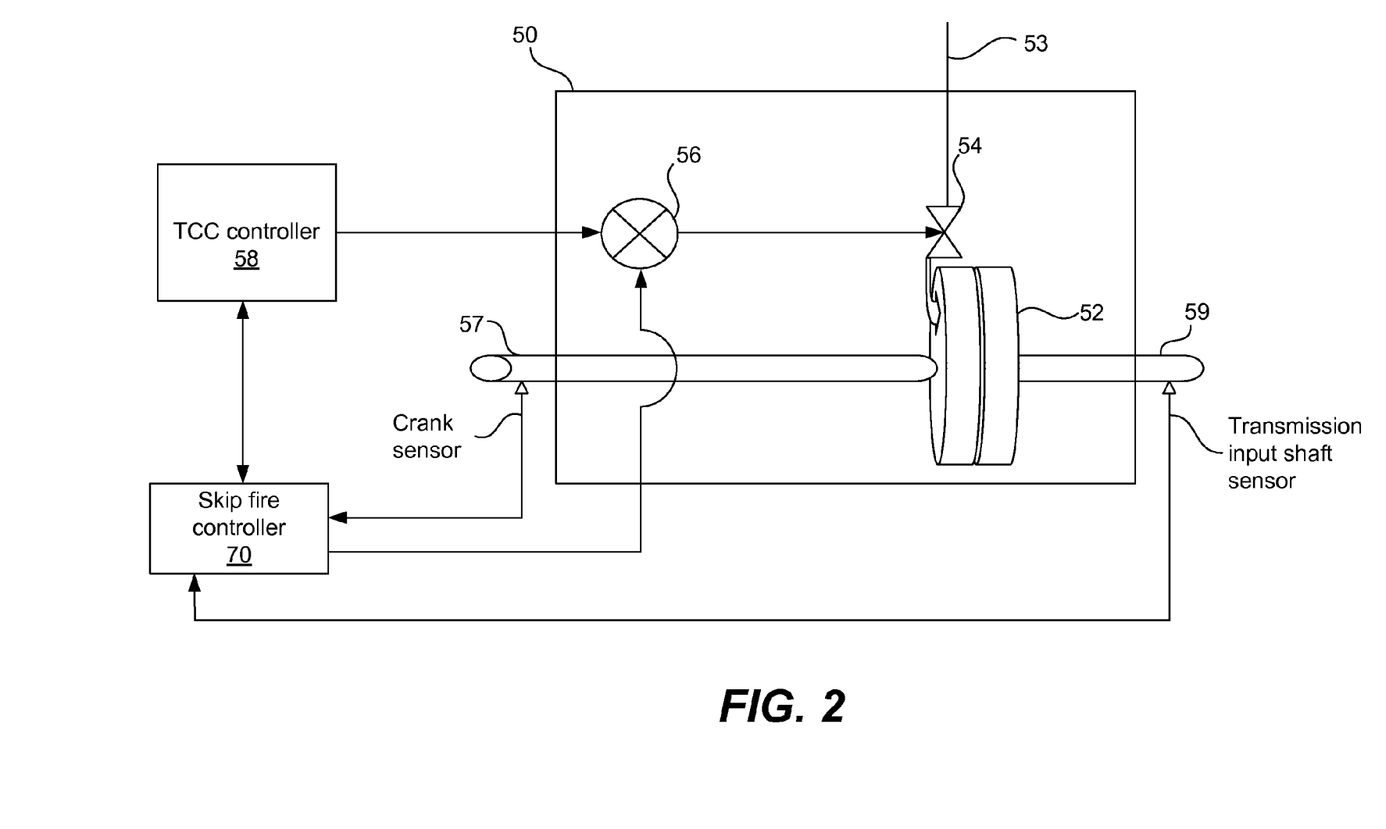
FIG. 2 is a schematic diagram of a torque converter control system architecture that is suitable for use controlling torque converter clutch slip in conjunction with skip-fire engine control.

FIG. 2 illustrates a torque converter control system architecture according to an embodiment. In the illustrated embodiment, a torque converter 50 includes a torque converter lock up clutch 52 and a fluid coupling mechanism (not shown). The torque converter slip varies as a function of hydraulic pressure applied to the torque converter. The torque converter has a torque converter input shaft 57 and a torque converter output shaft 59. The torque converter input shaft 57 couples torque from the engine to the torque converter. Its rotational speed may be determined using a crank sensor. The torque converter output shaft 59 couples torque to a powertrain component downstream of the torque converter 50, typically the transmission. Its rotational speed may be determined by a transmission input shaft sensor. A hydraulic pressure line 53 feeds the torque converter 50. A first solenoid 54 serves as a valve in the hydraulic pressure line. The opening and closing of the solenoid valve 54 can be used to regulate increases in hydraulic pressure within the torque converter and thus the amount of slip that occurs in the torque converter. A second solenoid (not shown) controls a gate that bleeds pressure from the torque converter and is thus used to control pressure reductions within the torque converter. The opening and closing of the solenoids and thus the hydraulic pressure within the torque converter 50 is controlled by a solenoid driver module 56. The solenoid driver module 56 may be responsive to commands from both a TCC controller 58 and a skip-fire controller 70. Inputs to the skip-fire controller 70 may include the crank and transmission speed sensors, measuring the speed of the torque converter 50 input shaft 57 and output shaft 59, respectively. The skip-fire controller 70 may communicate bi-directionally with the TCC controller 58. FIG. 2 should be considered as exemplary only and various torque control architectures may have extra components, may group components differently or may remove certain components.

Although the control system for a torque converter is shown in FIG. 2, it should be appreciated that similar control systems may be provided for any drive train component having controllably variable slip. These could include, for example, a differential, a dual clutch transmission or any other transmission that allows an internal clutch to slip, or any other drive train components that allows slip.

The torque converter allows driveline components downstream of the torque converter (e.g., the transmission) to run at a different rotational speed than the torque converter input shaft 57, which is typically rotating at the engine rotational speed. The amount of slip permitted by the torque converter is typically regulated by adjusting a pulse-width modulated signal which controls solenoid valves that increase or decrease the hydraulic line pressure, which in turn mechanically affects how much the torque converter slips relative to the input shaft speed. When desired, the torque converter can be operated at or nearly at a locked-state by engaging the torque converter clutch. This allows little to no loss in efficiency from input to output of the torque converter, since the torque and rotational speeds of the input shaft 57 and output shaft 59 are substantially equal.

The amount of slip permitted by the torque converter (i.e., the difference between the rotational speed of the torque converter input shaft 57 and the torque converter output shaft 59) is sometimes referred to herein as the slip RPM. When the vehicle is idling and during transitions, the amount of slip permitted by the torque converter (e.g., the slip RPM) can be increased, thereby either totally or partially effectively disconnecting the engine from the rest of the powertrain. This altered torque transfer path decouples engine torque impulses presented to the torque converter from the remainder of the powertrain, which can help smooth vehicle operation by helping reduce vibrations. U.S. patent application Ser. No. 13/963,819, assigned to Tula Technology Inc. the assignee on the present application, describes various strategies for slipping the torque converter to damp vibrations originating from an engine operating under skip-fire control.

Figure 3:
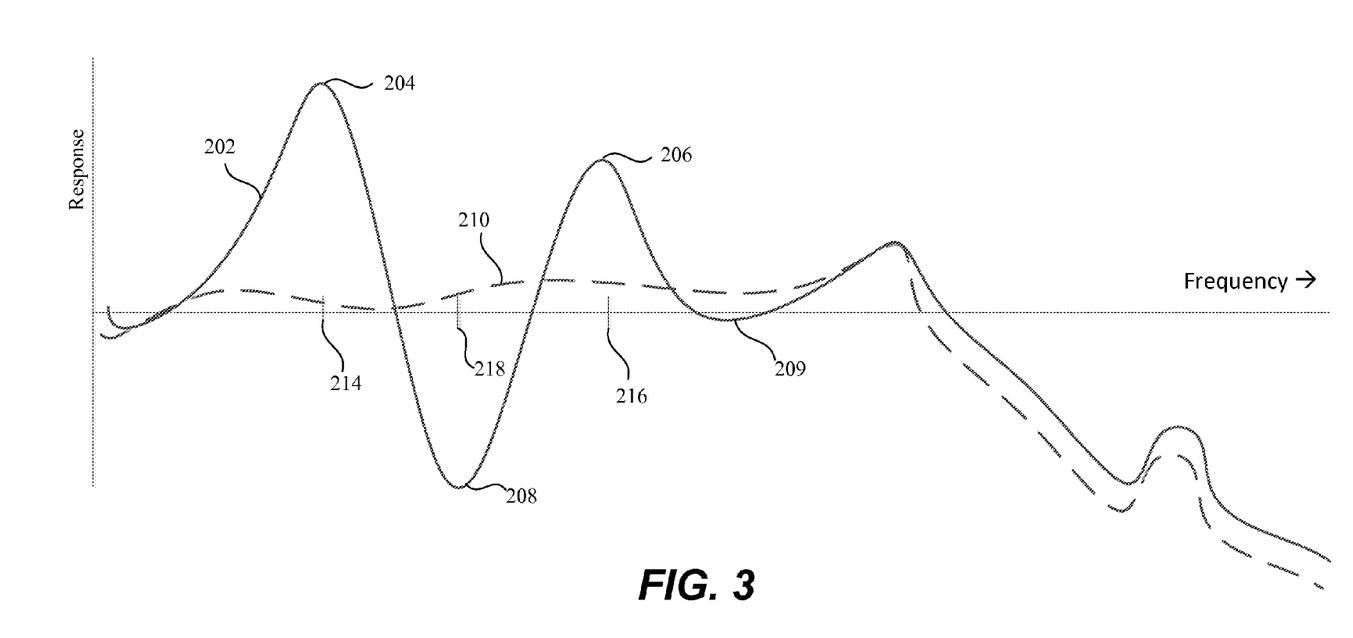
FIG. 3 is an exemplary plot showing the powertrain response as a function of frequency.

FIG. 3 shows an exemplary frequency response of the powertrain depicted in FIG. 1B. Curve 202 corresponds to a locked up torque converter 104, so that the torque converter 104 has no slip. In this case the engine 102 and wheels 112 are rigidly connected. Curve 202 may display multiple resonance peaks 204 and 206. These correspond to natural resonant frequencies of the powertrain. The resonant frequencies, 214 and 216, correspond to the first and second resonance, 204 and 206, respectively. The minimum in curve 202, shown as 208 at a frequency 218, may represent a tuned absorber mode of the powertrain 100. The curve 202 may also have a low response 209 at frequencies above the second resonance 216. The shape and frequency of the first and second resonant peaks, 204 and 206, tuned absorber mode 208, and low response 209 will vary depending on the powertrain design and operating transmission gear. Typically the frequency of the first resonant frequency 214 will vary in the range from 1 to 10 Hz depending on the transmission gear. Higher transmission gears will generally have a higher first resonant frequency. Typically the frequency of the second resonant frequency 216 will vary in the range from 10 to 50 Hz depending on the transmission gear in a similar manner. Curve 210 corresponds to a slipping torque converter clutch. The amount of slip can be controlled so that the resonance peaks 204 and 206 are effectively eliminated because the components downstream of the torque converter 104 are decoupled from the engine.

In practice, the amount and frequency of vibration generated during skip-fire operation of an engine tends to vary with the engine speed and the firing pattern or fraction. (The firing fraction is effectively the percentage of the possible cylinder firings that are actually fired). Some firing patterns and some firing fractions tend to have good vibration characteristics, while others tend to have less desirable vibration characteristics. Of course, there are a number of other operational factors that may affect vibration characteristics including engine speed, generated cylinder torque, transmission gear, etc. In general, the vibration characteristics of any particular vehicle operating condition can be characterized such that the vibrations associated with any particular set of skip-fire operating conditions can be reasonably predicted.

The assignee of the present application has described a number of skip-fire controllers that contemplate determining and then delivering a desired firing fraction. Examples of such controllers are described in U.S. patent application Ser. Nos. 13/654,244; 13/654,248; 13/744,134 and 61/682,065, which are all incorporated herein by reference. When the vehicle operating parameters, such as the firing fraction, transmission gear, engine speed, and cylinder torque are known, the torque converter slip can be controlled as a function of the vehicle operating parameters. In particular, certain vehicle operating parameters may generate conditions that produce little or no vibration at the first and second powertrain resonances. Under at least some of these vehicle operating parameters the torque converter clutch may be locked-up. Here locked-up may refer to both substantially locked-up, which means that the RPM slip is less than 5, 10, or 20 rpm or fully locked-up, which means that there is no RPM slip. Despite torque converter clutch lock-up, acceptable vehicle NVH is maintained because the powertrain resonances are not excited. Operation with skip-fire control allows more flexibility in determining the NVH signature of the engine than conventional all cylinder operation. The ability to select different firing fractions or firing patterns helps enable this invention by allowing combustion event frequency to be no longer solely dictated by the engine rotational speed and transmission gear setting.

Operation in the locked-up condition may be particularly appropriate for open highway cruising, where the vehicle may be operating at a substantially constant vehicle operating parameters over extended time periods. Often a vehicle cruising down an open highway will be operating in its highest transmission gear. In this case the tuned absorber resonance 208 (FIG. 3) may be in the vicinity of 10 to 20 Hz. The engine combustion frequency may be in the vicinity of the tuned absorber resonant frequency 218. For example, an eight cylinder, four-stroke engine operating at 1800 rpm with a firing fraction of 1/7 has a combustion event frequency of approximately 17 Hz. These engine operating conditions may correspond to appropriate values for operation with a locked-up torque converter. As another example a similar engine operating at 2500 rpm and a firing fraction of 1/3 will have a combustion event frequency of approximately 56 Hz. This frequency may lie in the vicinity of the low response 209 shown in FIG. 3. Vehicle operating parameters appropriate for operation with a locked-up torque converter clutch may be stored in a look up table or may be calculated based on a vehicle model. The look up table may also store information regarding whether the torque converter clutch should be fully locked-up or substantially locked-up. It should be appreciated that there may be factors other than the frequency response of the powertrain shown in FIG. 3 that influence the amount of torque converter slip.

Figure 4:
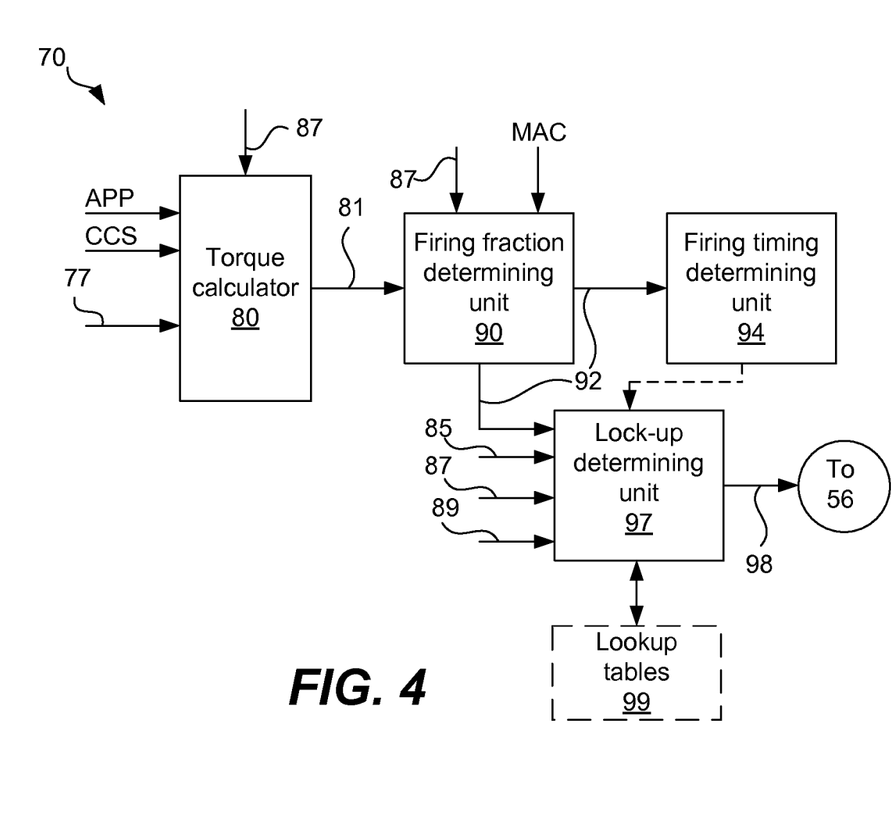
FIG. 4 is a block diagram of a skip-fire controller suitable for managing torque converter lock-up.

Referring next to FIG. 4, a skip-fire controller 70 suitable for managing torque converter lock-up will be described. FIG. 4 is a block diagram that diagrammatically illustrates a skip-fire controller arranged to facilitate torque converter lock-up management in accordance with one described embodiment. The skip-fire controller 70 includes a torque calculator 80, a firing fraction determining unit 90 (sometimes referred to as a firing fraction calculator) and a firing timing determining unit 94. The torque calculator 80 is arranged to determine the desired engine torque at any given time based on a number of inputs. The inputs may include the accelerator pedal position (APP), a cruise control system (CCS) and other possible inputs 77. The torque calculator outputs a requested torque 81 to the firing fraction calculator 90. The firing fraction calculator 90 is arranged to determine a firing fraction that is suitable for delivering the desired torque based on the current operating conditions and informs the firing timing determining unit 94 of the firing fraction 92 that is appropriate for delivering the desired torque. The firing timing determining unit 94 is responsible for determining a firing sequence that delivers the desired firing fraction. The firing sequence can be determined using any suitable approach. In some implementations, the firing may be determined dynamically on an individual firing opportunity by firing opportunity basis as described in some of the patents incorporated below. In others, pattern generators or predefined patterns may be used to facilitate delivery of the desired firing fraction. By way of example, co-assigned U.S. Pat. Nos. 7,577,511, 7,849,835, 7,886,715, 7,954,474, 8,099,224, 8,131,445, 8,131,447 which are incorporated herein by reference and other co-assigned patent applications describe a number of skip-fire controllers that are well suited for determining an appropriate firing sequence based on potentially time varying requested firing fractions and/or requested engine outputs.

The firing fraction 92 may also be delivered to a lock-up determining unit 97 that is responsible for determining vehicle parameters that are appropriate for operating with a locked-up torque converter clutch. Such operating parameters may include engine speed 87, per cylinder torque 89, and transmission gear 85. Additional vehicle operational characteristics, not shown in FIG. 4, may be utilized by lock-up determining unit 97 in its determination of the appropriate RPM slip.

The appropriate vehicle operating parameters suitable for torque converter clutch lock-up may be retrieved from lookup tables 99, calculated algorithmically, or determined in any other suitable manner. The lock-up determining unit 97 may output a signal 98 to TCC slip controller (e.g., solenoid driver module 56 shown in FIG. 2) which controls the torque converter hydraulic pressure appropriately to lock-up the torque converter clutch. In other embodiments, the firing fraction determining unit, TCC controller, or a variety of other components can be used to determine the appropriate conditions for torque converter lock-up (e.g., the slip determining unit 97 may be incorporated into the such components).

Many skip-fire controllers utilize predefined firing patterns rather than explicitly designating a desired firing fraction. The torque converter lock-up control described above with respect to the use of different firing fractions is equally applicable to skip-fire controllers using predefined firing patterns (which typically each inherently correspond to a designated firing fraction) or other mechanisms to determine the timing of the firings.

Within the skip-fire controller, it is also possible to use signal processing techniques to eliminate known resonant frequencies from the torque signature, so that even at a mean firing percentage or fraction which would otherwise excite a resonant mode of the powertrain, it is possible to phase the individual skips and fires so as to avoid this. As one simple example, a 4-cylinder 4-stroke engine at 1200 RPM will normally fire cylinders at 40 Hz. If there is a powertrain resonance at 20 Hz, then firing every other cylinder will excite it. If, instead, the controller is configured to superimpose ⅓ and ⅙ firing intervals (i.e. in a 110100 repeating sequence, where "1" means a fire and "0" means a skip), the same mean torque is produced, but without the 20 Hz fundamental content. In a more comprehensive solution, real-time model-based signal processing which comprehends the known resonant frequency(ies) can influence the individual fire/skip decisions so as to continuously prevent generation of harmful frequency content even as engine speed and driver torque demand change. Combining this idea with a priori knowledge of the locked-up resonant frequencies and tuned-absorber modes can allow more aggressive TCC use than either approach alone.

Vehicle overall fuel efficiency is proportional the product of the efficiency of the various powertrain components. In particular, skip-fire control provides a method of operating an engine more efficiently over a wide range of engine speeds and operating loads. Many skip-fire control strategies focus on operating the engine at its most fuel efficient operating point. However, if at the most fuel efficient engine operating point there is slip in the torque converter, overall fuel efficiency can be further improved by locking the torque converter. Generally this is not a suitable option because torque converter lock-up would result in unacceptable NVH. However, as described above under some vehicle operating conditions it may be appropriate to operate with a locked-up torque converter clutch. A skip-fire engine control unit, such as that shown in FIG. 2, may be configured to operate the engine at a less fuel efficient operating point if that operating point corresponds to conditions appropriate for locking-up the torque converter. In such cases, overall vehicle fuel efficiency may be optimized, even though the engine is operating slightly away from an optimum condition.

Although regulating slip has been described primarily in the context of regulating the slip of a torque converter clutch, it should be appreciated that similar results can be achieved by any mechanism (clutch or otherwise) that can controllably regulate the slippage of one segment of the drive train to another segment of the drive train. These might include the differential, a dual clutch transmission, a slipping clutch transmission or another drive train component.

Although only a few embodiments of the invention have been described in detail, it should be appreciated that the invention may be implemented in many other forms without departing from the spirit or scope of the invention. For example, there are several references to the term, "cylinder." It should be understood that the term cylinder should be understood as broadly encompassing any suitable type of working chamber. The present invention may be useful in engines having a dual clutch transmission. The present invention may also be useful in engines that do not use skip-fire control. A continuously variable transmission may be particularly useful with the present invention because it allows remaining in a locked state over larger variations in output speed. Therefore, the present embodiments should be considered illustrative and not restrictive and the invention is not to be limited to the details given herein.

What is claimed is:

1. A method of operating a vehicle having an internal combustion engine and a powertrain, wherein the powertrain includes an engine-decoupling friction interface and has one or more resonant frequencies of concern, the method comprising:
   operating the engine in a skip-fire manner to supply motive power to move the vehicle;
   transferring the engine motive power through the friction interface;
   while the engine is operating in the skip-fire manner, automatically determining whether current skip-fire operating conditions are suitable for locking-up the friction interface, wherein the friction interface lock-up determination is based at least in part on current engine speed and current skip-fire firing fraction and is arranged to ensure that a current combustion frequency does not incite any of the one or more resonant frequencies of concern; and locking-up the friction interface during operation in the skip-fire manner when it is determined that current skip fire operating conditions are suitable for locking-up the friction interface.

2. The method of claim 1 wherein the engine-decoupling friction interface is selected from the group consisting of:
a lockup clutch of a torque converter;
an input clutch of an automated manual transmission;
an input clutch of a dual-clutch transmission.

3. A method as recited in claim 1 wherein the friction interface is locked-up only when the current skip-fire operation conditions produce little or no vibration at the resonant frequencies of concern.

4. A method as recited in claim 1 wherein the skip-fire operation conditions suitable for locking-up the friction interface are predetermined.

5. A method as recited in claim 1 wherein the powertrain includes a multi-speed transmission.

6. A method as recited in claim 1 wherein the determination of whether the current skip-fire operating conditions are suitable for locking-up the friction interface is further based in part on the current transmission gear setting.

7. A method as recited in claim 1 wherein:
the powertrain absorbs vibrations at a specified tuned absorber frequency; and
the friction interface is at least sometimes locked-up when current skip-fire operation conditions predominately produce vibration frequencies in the vicinity of the tuned absorber frequency of the powertrain.

8. A method as recited in claim 1 wherein:
the resonant frequencies of concern include first and second powertrain resonant frequencies, the second powertrain resonant frequency being a higher frequency than the first powertrain resonant frequency; and
the friction interface is at least sometimes locked-up when current skip-fire operation conditions predominately produce vibration frequencies at frequencies above the second powertrain resonance frequency.

9. A method as recited in claim 1 where there is no slip in the friction interface when the friction interface is locked-up.

10. A method as recited in claim 2 where the friction interface is a torque converter clutch and the slip in the torque converter clutch is less than a value selected from the group consisting of 5, 10, and 20 revolutions per minute when the torque converter clutch is locked-up.

11. A method as recited in claim 1 where the determination of whether current skip-fire operation conditions are suitable for locking-up the friction interface is determined from a library of known acceptable conditions.

12. A method as recited in claim 1 where the determination of whether current skip-fire operation conditions are suitable for locking-up the friction interface is determined algorithmically based at least in part on the engine speed.

13. A method as recited in claim 1 where operating the engine in a skip-fire manner includes selecting a firing sequence which delivers substantially the required average torque and avoids generating frequencies at powertrain resonances.

14. A method as recited in claim 1 wherein the determination of whether the current skip-fire operating conditions are suitable for locking-up the friction interface is further based in part on the current per cylinder torque.

15. A method as recited in claim 1 wherein the powertrain includes a continuously variable transmission.

16. A method of operating a vehicle having an internal combustion engine and a powertrain, wherein the powertrain includes an engine-decoupling friction interface, the method comprising:
determining a set of available skip fire firing fractions capable of delivering a currently requested engine output each available skip fire firing fraction having an associated friction interface slip at current operating conditions;
selecting an operational skip fire firing fraction from a set of available skip fire firing fractions that are capable of delivering the desired engine output, wherein the selection of the operational skip fire firing fraction is based in part on the friction interface slip associated with the selected operational skip fire firing fraction indicating that the friction interface may be locked-up during operation at the current operating conditions;
operating the engine at the selected operational skip fire firing fraction to supply motive power to move the vehicle;
transferring the engine motive power through the friction interface;
locking-up the friction interface so that losses in the engine-decoupling friction interface are minimized so as to provide overall optimum vehicle fuel efficiency.

17. A method of operating a vehicle having an internal combustion engine and a powertrain, wherein the powertrain has a specified tuned absorber frequency and includes an engine-decoupling friction interface, the method comprising:
determining a set of available skip fire firing fractions capable of delivering a currently requested engine output;
selecting an operational firing fraction from the set of available skip fire firing fractions, wherein the selected operational firing fraction has a characteristic frequency close to the specified tuned absorber frequency at a current engine speed; and
locking-up the friction interface while operating at the selected operational firing fraction.

18. A method as recited in claim 17 wherein the selected operational firing fraction is not the lowest available firing fraction in the set of available skip fire firing fractions capable of delivering the currently requested engine output.

* * * * *